United States Patent

[11] 3,569,625

[72] Inventor T. Burr Jackson
 Riverside, Calif.
[21] Appl. No. 106,419
[22] Filed Apr. 27, 1961
[45] Patented Mar. 9, 1971
[73] Assignee the United States of America as represented by the Secretary of the Navy

[54] TELEMETRY DATA TRANSMISSION SYSTEM
 2 Claims, 3 Drawing Figs.

[52] U.S. Cl. .................................................. 178/22,
 179/1.5, 325/32
[51] Int. Cl. ...................................................... H04l 9/02
[50] Field of Search........................................... 250/6.6;
 179/1.5; 325/32, 122; 338/118, 160, 176, 178;
 179/1.5

[56] References Cited
UNITED STATES PATENTS

| | | | |
|---|---|---|---|
| 2,403,540 | 7/1946 | Meneley | 250/6.6 |
| 2,412,964 | 12/1946 | Chatterjea et al. | 250/6.6 |
| 3,012,245 | 12/1961 | Purington | 250/6.6 |
| 2,627,593 | 2/1953 | Tietig | 338/176 |

Primary Examiner—Rodney D. Bennett, Jr.
Assistant Examiner—Daniel C. Kaufman
Attorneys—J. M. St. Amand, T. M. Phillips and W. O. Quesenberry ABSTRACT: In a data transmission system the combination comprising:
 a. a signal source representing a measured quantity;
 b. a reversible polarity DC power supply;
 c. a potentiometer connected to said reversible polarity DC power supply;
 d. coded disc means operatively associated with the movable tap of said potentiometer for providing a predetermined reference voltage;
 e. adding circuit means having a first input coupled to said signal source and a second input coupled to the movable tap of said potentiometer for adding said signal representing a measured quantity and the predetermined varying reference voltage;
 f. signal level detector means coupled to said signal source and to said reversible polarity DC power supply for reversing the polarity of said power supply when said signal source is of a predetermined value;
 g. means coupled to said adding circuit means for transmitting said combined signal to a receiving station;
 h. means located at said receiving station for detecting the polarity and subtracting a voltage identical to said predetermined varying reference voltage from said transmittal signal; and
 i. circuit means coupled to said subtracting means for utilizing the remaining portion of said transmittal signal.

AIRBORNE SYSTEM

GROUND STATION SYSTEM

T. BURR JACKSON
INVENTOR.

BY T. M. Phillips
J. M. St. Amand
ATTORNEYS

AIRBORNE CHANNEL

GROUND STATION CHANNEL

TELEMETRY DATA TRANSMISSION SYSTEM

The invention herein described may be manufactured and used by or for the Government of the United States of America for governmental purposes without the payment of any royalties thereon of therefor.

The present invention relates to a telemetry data transmission system and more particularly to a telemetry data transmission system having improved security means.

There has become increased concern about the security of telemetry links utilized in the testing of missles.

Accordingly, an object of the present invention is to provide a system for the secure transmission of telemetry data.

Another object is to provide a secure telemetry transmission system by means of code discs for adding and subtracting a randomly varying continuous voltage function to a known voltage function.

Other objects and many of the attendant advantages of this invention will become readily appreciated as the same becomes better understood by reference to the following detailed description when considered in connection with the accompanying drawings wherein.

Figure 1:
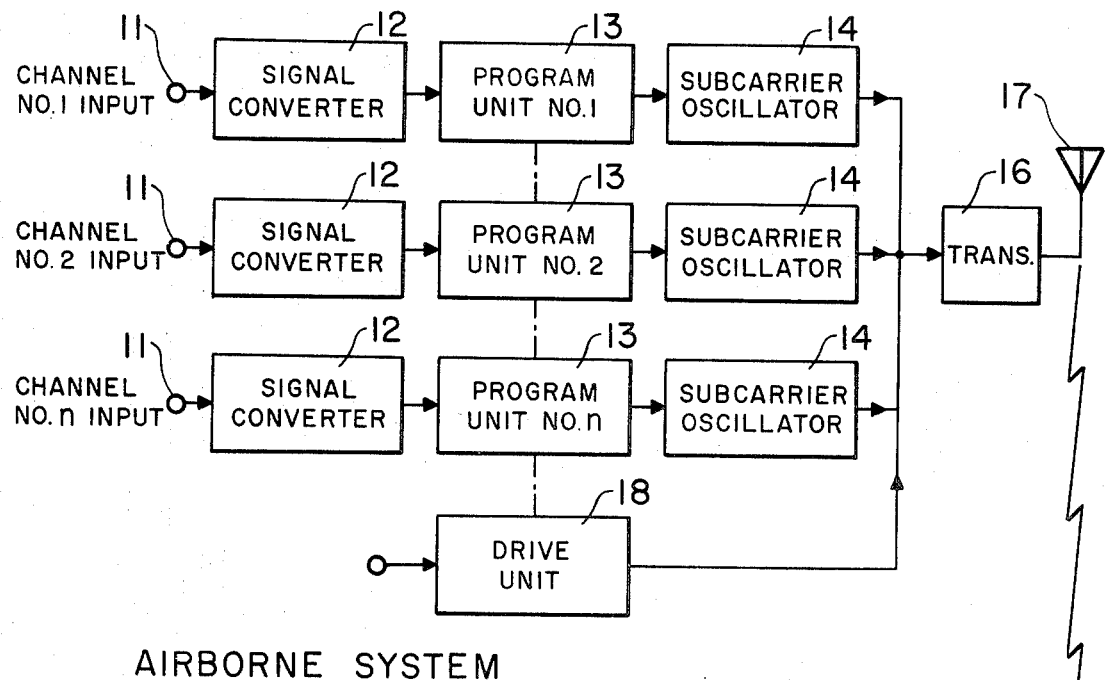
FIG. 1 is a block diagram of an embodiment of the invention.
Figure 1:
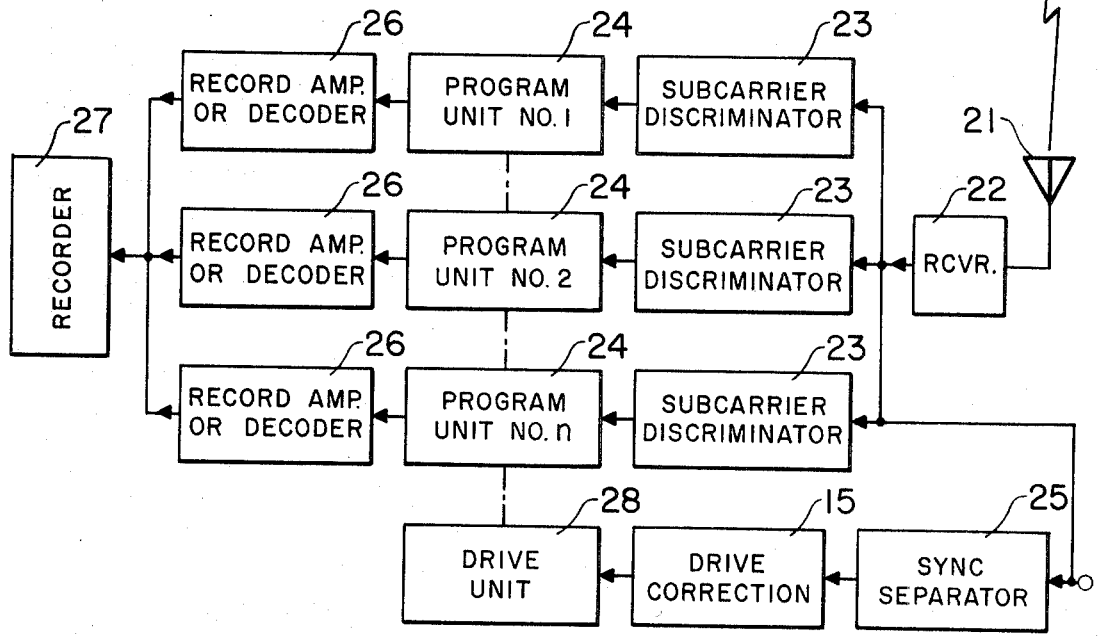

Referring now to the drawings wherein like reference characters designate like or corresponding parts throughout the several views, there is shown in FIG. 1 the transmitting or airborne and receiving or ground station portions of a telemetry system. There may be any number of channels depending on the data to be transmitted; however, for purposes of describing the invention only one channel will be described.

Figure 2:
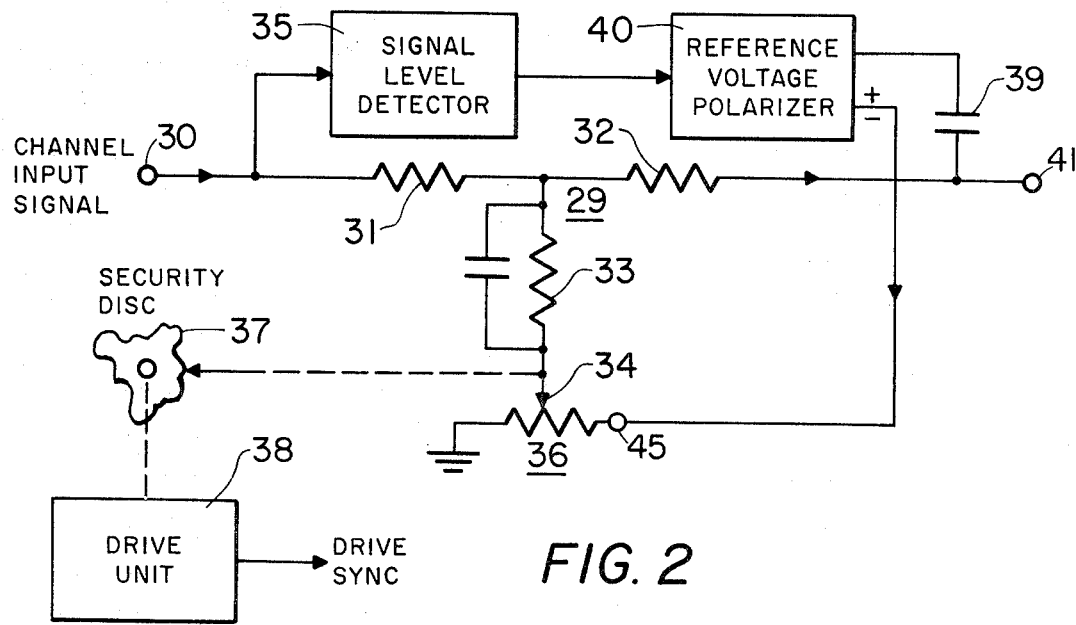
FIG. 2 is a schematic diagram of one of the program units shown in one of the airborne channels of FIG. 1.

A signal proportional to any quantity to be measured is applied to terminal 11 and converted to a signal having an amplitude from 0 to 5 volts by converter 12 which may be of any well-known type as, for example, a potentiometer. The output signal from converter 12 is coupled to program unit 13 where it is camouflaged in the manner shown in FIG. 2 and described below. The output signal from program unit 13 is coupled to subcarrier oscillator or multiplexer 14 to cause the frequency thereof to vary as a function of the magnitude of the camouflaged signal. The outputs of subcarrier oscillator 13 are combined with a sync signal from drive unit 18 which is the excitation signal and applied to frequency modulated transmitter 16 which transmits a camouflaged signal from antenna 17.

The ground station receives the telemetry signal at antenna 21 which is coupled to receiver 22. The output of receiver 22 is coupled to subcarrier discriminator or demultiplexer 23 where the camouflaged signal is recovered and fed to program unit 24 which performs the reversed function of program unit 13 of the airborne system. The output from receiver 22 is also coupled to sync separator 25 where the excitation signal from drive unit 18 is separated out for purposes of providing a synchronized excitation signal for drive unit 28. Amplifier 26 amplifies the output of unit 24 to produce a signal which will operate recorder 27. Drive units 28 and 18 are synchronized by means of synchronous drive correction circuit 15 which is excited by the excitation signal added to the transmitted signal and separated out by sync separator 25. Circuit 15 also includes means for locking units 18 and 28 in step which may be, for example, a magnetic clutch which is caused to engage by a pulse transmitted from drive unit 18.

Figure 3:
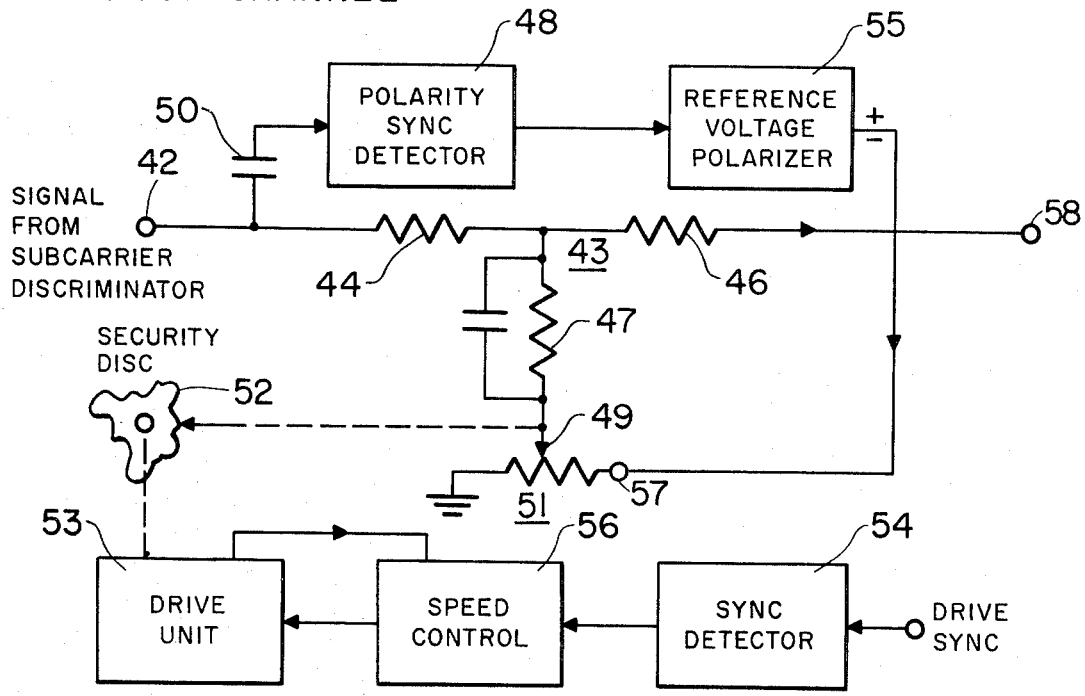
FIG. 3 is a schematic diagram of one of the program units shown in one of the ground station channels of FIG. 1.

Referring now to FIG. 3 which shows program unit 13 in detail, input terminal 30 is coupled to a mixing network 29 comprised of resistors 31, 32 and 33 and to signal level detector 35. Also coupled as an input to mixing network 29 is the movable tap 34 of potentiometer 36. Movable tap or pickoff 34 is mechanically driven by a rotating disc 37 which in turn is driven by a constant speed drive unit 38. The output of signal level detector 35 is coupled to reference voltage polarizer 40 which has one output coupled through coupling capacitor 39 to the output of mixing network 29 and another output coupled to the terminal 45 of potentiometer 36. The purpose of capacitor 39 is to couple a synchronizing pulse at the instant of a reversal of polarity of the voltage applied to potentiometer 36 and to isolate reference voltage source 40 from mixing network 29. The pulse polarity may be of a polarity corresponding to the polarity of the voltage supplied to potentiometer 36. Output terminal 41 is coupled to subcarrier oscillator 14.

Referring to FIG. 3, terminal 42 is coupled to the input of resistance network 43 comprised of resistors 44, 46 and 47 and to the input of polarity synchronizer detector 48 through coupling capacitor 50. Also coupled to network 43 is variable tap 49 of potentiometer 51 which is driven by a rotating disc 52 which in turn is driven by controlled speed drive unit 53. The speed of drive unit 53 is controlled from a sync signal from drive unit 38 which is detected in sync detector 54 and fed to speed control 56. The output of detector 48 is coupled to reference voltage polarizer 55 which has its output coupled to terminal 57 of potentiometer 51.

In operation the randomly varying continuous voltage function generated by the rotation of disc 37 is added to the data quantity signal to provide a camouflaged signal. Signal level detector 35 determines if the data voltage at any instant is above or below the midpoint of its full-scale value. Reference voltage polarizer 38 which is a DC source of reversible polarity supplies the excitation voltage for the reference function pickoff potentiometer 36. The polarity of reference voltage 40 depends upon the level of the input data voltage as determined by detector 35. When the amplitude of the data voltage is greater than one-half its full-scale value, the excitation voltage on potentiometer 36 would be such as to subtract from the data voltage. When the data voltage is less than one-half its full-scale value, the excitation voltage will add to the data voltage. By this means the data function would be allowed to pass through its normal full-scale voltage range. At the receiving station a randomly varying continuous voltage function of opposite polarity to that generated in the airborne unit is subtracted from the received composite signal leaving a voltage function corresponding to the original data function. Each reference disc in the receiving unit is an exact duplicate of a companion disc in the airborne unit. However, the polarity of the excitation voltage for potentiometer 43 is the reverse of that required in the transmitting unit. Resistance network 43 is similar to resistance network 29 in the airborne unit and is coupled by means of terminal 42 to the output of subcarrier discriminator 23 where the reference voltage function that was added in the airborn unit is subtracted leaving the original data function available at terminal 58 for recording or data reduction purposes.

Where some loss of data accuracy can be tolerated the system as described above may be simplified by omitting in the airborne channel signal level detector 35, reference voltage polarizer 40 and coupling capacitor 39 and applying a fixed voltage to terminal 45. Corresponding elements in the ground station channel would be omitted. A fixed voltage similar to the fixed voltage of the airborne system would be applied to terminal 57 of potentiometer 51.

Although the system described above is applicable to a subcarrier system the practice of the invention is not limited thereto and may apply equally well to any transmission system utilizing variable input voltage function to the multiplexer.

Obviously many modifications and variations of the present invention are possible in the light of the above teachings. It is therefore to be understood that within the scope of the appended claims the invention may be practiced otherwise than as specifically described.

I claim:

1. In a data transmission system the combination comprising:

a. a signal source representing a measured quantity;

b. a reversible polarity DC power supply;
c. a potentiometer connected to said reversible polarity DC power supply;
d. coded disc means operatively associated with the movable tap of said potentiometer for providing a predetermined reference voltage;
e. Adding circuit means having a first input coupled to said signal source and a second input coupled to the movable tap of said potentiometer for adding said signal representing a measured quantity and the predetermined varying reference voltage;
f. signal level detector means coupled to said signal source and to said reversible polarity DC power supply for reversing the polarity of said power supply when said signal source is of a predetermined value;
g. means coupled to said adding circuit means for transmitting said combined signal to a receiving station;
h. means located at said receiving station for detecting the polarity and subtracting a voltage identical to said predetermined varying reference voltage from said transmittal signal; and
i. circuit means coupled to said subtracting means for utilizing the remaining portion of said transmittal signal.

2. In a secure telemetry data transmission system for guided missiles:
a. an airborne channel comprising an adding circuit having a first input terminal adapted to be connected to a signal source representing a measured quantity;
b. a second input terminal coupled to the movable tap of a first potentiometer;
c. a reversible polarity DC power supply coupled to said potentiometer for providing a reference voltage therefor;
d. a first security disc operatively associated with said movable tap for causing the voltage at said second input terminal to vary in a predetermined manner;
e. signal level detector means coupled to said first input terminal and to said reversible polarity DC power supply for reversing the polarity of said power supply when the signal applied to said first terminal is of a predetermined value;
f. said adding circuit having an output terminal coupled to means for transmitting the combined signal of said adding circuit;
g. a ground station channel comprising a subtracting circuit having an input terminal coupled to the output of a receiver;
h. a second input terminal coupled to the movable tap of a second potentiometer;
i. a second reversible polarity DC power supply coupled to said potentiometer for providing a reference voltage of opposite polarity to that of said reference voltage in said airborne channel;
j. polarity detector means coupled to said first input terminal and to said reversible polarity DC power supply for reversing the polarity of said second DC power supply;
k. a second security disc identical to said first security disc and synchronized therewith being operatively associated with the movable tap of said second potentiometer for causing a voltage to be applied to said subtracting circuit in the same manner as the voltage applied to the movable tap of said first potentiometer but of opposite polarity; and
l. means coupled to the output of said subtracting circuit for utilizing the output thereof.